United States Patent [19]

Butts, Jr. et al.

[11] Patent Number: 5,303,362
[45] Date of Patent: Apr. 12, 1994

[54] COUPLED MEMORY MULTIPROCESSOR COMPUTER SYSTEM INCLUDING CACHE COHERENCY MANAGEMENT PROTOCOLS

[75] Inventors: H. Bruce Butts, Jr.; David A. Orbits, both of Redmond; Kenneth D. Abramson, Seattle, all of Wash.

[73] Assignee: Digital Equipment Corporation, Maynard, Mass.

[21] Appeal. No.: 673,766

[22] Field: Mar. 20, 1991

[51] Int. Cl.$^5$ .............................................. G06F 12/06
[52] U.S. Cl. .............................. 395/425; 364/DIG. 1; 364/228.3; 364/229.2; 364/243.4
[58] Field of Search ... 364/200 MS File, 900 MS File; 395/400, 425

[56] References Cited

U.S. PATENT DOCUMENTS

| | | | |
|---|---|---|---|
| 3,735,360 | 5/1973 | Anderson et al. | 395/250 |
| 4,016,541 | 4/1977 | Delagi et al. | 395/775 |
| 4,161,024 | 7/1979 | Joyce et al. | 395/325 |
| 4,442,487 | 4/1984 | Fletcher et al. | 395/425 |
| 4,571,672 | 2/1986 | Hatada et al. | 395/425 |
| 4,591,977 | 5/1986 | Nissen et al. | 395/200 |
| 4,744,078 | 5/1988 | Kowalczyk | 395/325 |
| 4,747,043 | 5/1988 | Rodman | 395/425 |
| 4,755,930 | 7/1988 | Wilson, Jr. et al. | 395/425 |
| 4,757,438 | 7/1988 | Thatte et al. | 395/400 |
| 4,760,521 | 7/1988 | Rehwald et al. | 395/425 |
| 4,785,395 | 11/1988 | Keeley | 395/425 |
| 4,811,216 | 3/1989 | Bishop et al. | 395/425 |
| 4,812,981 | 3/1989 | Chan et al. | 395/650 |
| 4,939,641 | 7/1990 | Schwartz et al. | 395/425 |
| 4,965,717 | 10/1990 | Cutts, Jr. et al. | 395/425 |
| 5,010,477 | 4/1991 | Omoda et al. | 395/800 |
| 5,029,070 | 7/1991 | McCarthy et al. | 395/425 |
| 5,097,409 | 3/1992 | Schwartz et al. | 395/425 |
| 5,117,350 | 5/1992 | Parrish et al. | 395/425 |
| 5,123,106 | 6/1992 | Otsuki et al. | 395/725 |
| 5,146,603 | 9/1992 | Frost et al. | 395/425 |
| 5,146,607 | 9/1992 | Sood et al. | 395/800 |
| 5,148,533 | 9/1992 | Joyce et al. | 395/425 |

OTHER PUBLICATIONS

Anant Agarwal, Richard Simoni, John Hessessy and Mark Horowitz, "An Evaluation of Directory Schemes for Cache Coherence," Stanford University, California, 1988.

Alan L. Cox, and Robert J. Fowler, "The Implementation of a Coherent Memory Abstraction on a NUMA Multiprocessor: Experiences with Platinum" (Revised), University of Rochester, Rochester, New York, May 6, 1989.

Mark A. Holliday, "Reference History, Page Size, and Migration Daemons in Local/Remote Architectures," Duke University, Durham, North Carolina, 1989.

C. Scheurich and M. Dubois, "Dynamic Page Migration in Multiprocessors with Distributed Global Memory," University of Southern California, Los Angeles, California, 1988.

Ming-Chit Tam, Jonathan M. Smith and David J. Farber, "A Taxonomy-Based Comparison of Several Distributed Shared Memory Systems," University of Pennsylvania, Philadelphia, Pennsylvania, May 15, 1990.

Primary Examiner—Joseph L. Dixon
Assistant Examiner—Hiep T. Nguyen
Attorney, Agent, or Firm—Christensen, O'Connor, Johnson & Kindness

[57] ABSTRACT

A coherent coupled memory multiprocessor computer system that includes a plurality of processor modules (11a, 11b . . . ), a global interconnect (13), an optional global memory (15) and an input/output subsystem (17,19) is disclosed. Each processor module (11a, 11b . . . ) includes: a processor (21); cache memory (23); cache memory controller logic (22); coupled memory (25); coupled memory control logic (24); and a global interconnect interface (27). Coupled memory (25) associated with a specific processor (21), like global memory (15), is available to other processors (21). Coherency between data stored in coupled (or global) memory and similar data replicated in cache memory is maintained by either a write-through or a write-back cache coherency management protocol. The selected protocol is implemented in hardware, i.e., logic, form, preferably incorporated in the coupled memory control logic (24) and in the cache memory controller logic (22). In the write-through protocol, processor writes are propagated directly to coupled memory while invalidating corresponding data in cache memory. In contrast, the write-back protocol allows data owned by a cache to be continuously updated until requested by another processor, at which time the coupled memory is updated and other cache blocks containing the same data are invalidated.

15 Claims, 9 Drawing Sheets

COUPLED MEMORY MULTIPROCESSOR COMPUTER SYSTEM INCLUDING CACHE COHERENCY MANAGEMENT PROTOCOLS

TECHNICAL AREA

This invention relates to multiprocessor computer systems and, more particularly, to multiprocessor computer systems in which system memory is distributed such that a portion of system memory is coupled to each processor of the system.

BACKGROUND OF THE INVENTION

Memory latency, i.e., the time required to access data or instructions stored in the memory of a computer, has increasingly become the bottleneck that prevents the full realization of the speed of contemporary single and multiprocessor computer systems. This result is occurring because the speed of integrated processors has outstripped memory subsystem speed. In order to operate most efficiently and effectively, fast processors require the contradictory features of reduced memory latency and larger memory size. Larger memory size implies greater physical size, greater communication distances, and slower access time due to the additional signal buffers needed to drive heavily loaded address, data and control signal lines, all of which increase memory latency. The primary negative effect of memory latency is its effect on processor speed. The longer it takes to obtain data from memory, the slower a processor runs because processors usually remain idle when they are waiting for data. This negative effect has increased as processor speed has outstripped memory subsystem speed. Despite the gains made in high-density, high-speed integrated memories, the progress to date still leaves the memory subsystem as the speed-limiting link in computer system design. This is true regardless of whether the computer system includes a single processor or a plurality of processors.

One way to reduce average memory latency is to add a cache subsystem to a computer system. A cache subsystem consists of a small memory situated adjacent to a processor that is hardware controlled rather than software controlled. Frequently used datum and instructions are replicated in cache memories. Cache subsystems capitalize on the property that once a datum or instruction has been fetched from system memory, it is very likely that it will be reused in the near future. Due to the close association between cache memory and its associated processor and the nature of the control (hardware as opposed to software), cache memory latency is several times less than that of system memory. Because access is much more rapid, overall speed is improved in computer systems that include a cache subsystem. As memory latency increases with memory size, hierarchical caches have been developed to maintain average memory latency at a low level. Some high-performance processors include separate instruction and datum caches that can be simultaneously accessed. (For simplicity of description, datum, instructions and any other forms of information commonly stored in computer memories are collectively hereinafter referred to as data.)

While computer systems that include a cache subsystem have a number of advantages, one disadvantage is the expense of cache memories. This disadvantage is enhanced because a cache memory does not add capacity to system memory. Rather, cache memories are add-ons to system memory, because, as noted above, cache memories replicate data stored in system memory. The replication of data leads to another disadvantage of cache memories, namely, the need to maintain coherency between data stored at two or more locations in the memories of a computer system. More specifically, because data stored at either location can be independently updated, a computer system that includes a cache subsystem requires a way of maintaining coherency between independent sources of the same data. If coherency is not maintained, data at one location will become stale when the same data at another location is updated. The use of stale data can lead to errors.

Several different types of cache management algorithms have been developed to govern what occurs when data stored in a cache are updated. The simplest algorithm is known as a "write-through" cache coherency management protocol. A write-through cache coherency management protocol causes processor writes to be propagated directly to system memory. All caches throughout the computer system are searched, and any copies of written data are either invalidated or updated. While a write-through cache coherency management protocol can be used with multiprocessor computer systems that include a large number of processors, a write-through cache coherency management protocol is better suited for single processor computer systems or multiprocessor computer systems incorporating a limited number, e.g., four, of processors.

A more complex, but higher performance, coherency management algorithm is known as a "write-back" cache coherency management protocol. Like a write-through cache coherency management protocol, a write-back cache coherency management protocol is an algorithm that is normally incorporated in the hardware of a computer system that controls the operation of a cache. In a write-back cache coherency management protocol, initial processor writes are written only to cache memory. Later, as necessary, updated data stored in a cache memory is transferred to system memory. Updated data transfer occurs when an input/output device or another processor requires the updated data. A write-back cache coherency management protocol is better suited for use in multiprocessor computer systems that include a large number of processors (e.g., 24) than a write-through cache coherency management protocol because a write-back cache coherency management protocol has a lower impact on the system interconnect because a write-through cache coherency management protocol greatly reduces write traffic.

One of the first write-back coherency management protocols was suggested by Dr. James R. Goodman in his paper entitled "Using Cache Memory to Reduce Processor Memory Traffic" (10th International Symposium of Computer Architecture, 1983). Dr. Goodman's improvement is based on the observation that if the sole copy of data associated with a specific system memory location is stored in a cache, the cache copy can be repeatedly modified without the need to broadcast write-invalidate messages to all other system caches each time a modification occurs. More specifically, Dr. Goodman's improvement requires the addition of a state bit to each cache copy. The state bit indicates that the copy is either "shared" or "owned." When a system memory location is first read, and data supplied to a cache, the state bit is set to the "shared" state. If the cache copy is later written, i.e., modified, the state bit transitions to the "owned" state. At the same time, a write-invalidate message is broadcast, resulting in the updated cache copy of the data being identified as the only valid copy associated with the related system memory location. As long as the cache location remains in an owned state, it can be rewritten, i.e., updated, without the need to broadcast further write-invalidate messages. A remote request for the data to the memory location associated with the cached copy causes a transition back to the shared state, and the read request to be satisfied by either the cache and, then, updating the related system memory location, or by the cache delaying the memory request until valid data is rewritten to the system memory location.

Recently, proposals have been made to distribute memory throughout a multiprocessor computer system, rather than use bank(s) of global memory accessible by all processors via a common interconnect bus. More specifically, in distributed memory multiprocessor computer systems, a portion of system memory is physically located adjacent to the processor the memory portion is intended to serve. Research in this area has grown out of attempts to find ways of creating effective multiprocessor computer systems out of a large number of powerful workstations connected together via a network link. In the past, distributed shared memory computer networks have used various software-implemented protocols to share memory space. The software-implemented protocols make the distributed memory simulate a common global memory accessible by all of the computers connected to the network. Memory latency is improved because the portion of memory associated with a specific processor can be accessed by that processor without use of the network link. An example of this research work is the BBN Butterfly computer system developed by BBN Laboratories, Inc. See *Butterfly TM Parallel Processor Overview*, BBN Report No. 6148, Version 1, Mar. 6, 1986, and *The Uniform System Approach to Programming the Butterfly TM Parallel Processor*, BBN Report No. 6149, Version 2, Jun. 16, 1986.

A drawback of the software-implemented protocols used in the BBN Butterfly and the like computer systems is their extremely poor performance when the amount of sharing between processors is large or when the memory associated with a single processor is insufficient to meet the needs of a program and it becomes necessary to use the memory associated with another processor and/or to make data calls to storage devices, such as a hard disk. In the past, such requirements have significantly reduced processing speed. Such requirements have also negatively impacted the bandwidth requirements of the network linking the processors together. A further disadvantage has been the increased overhead associated with the management of data stored at different locations in the distributed memory of the computer system. More specifically, the processing speed of prior art distributed memory multiprocessor computer systems have been improved by replicating shared data in the memories associated with the different processors needing the data. This has a number of disadvantages. First, replicating data in system memory creates a high memory overhead, particularly because system memory is stored on a page basis and page sizes are relatively large. Recently, page sizes of 64K bytes have been proposed. In contrast cache memories store data in blocks of considerably smaller size. A typical cache block of data is 64 bytes. Thus, the "granularity" of the data replicated in system memory is considerably larger than the granularity of data replicated in cache memory. The large granularity size leads to other disadvantages. Greater interconnect bandwidth is required to transfer larger data granules than smaller data granules. Coherency problems are increased because of the likelihood that more processors will be contending for the larger granules than the number contending for smaller granules on a packet-to-packet basis.

In summary, in the last several years, very large-scale integrated circuit (VLSI) processor speeds have been increased by roughly an order of magnitude due to continual semiconductor improvements and due to the introduction of reduced instruction set computer (RISC) architectures. As processor speeds have improved, large, fast and expensive cache memories have been needed in order to reduce average memory latency and keep processor idle times reasonable. Even with improved cache memories and improved ways of maintaining data coherency, average memory latency remains the bottleneck to improving the performance of multiprocessor computer systems.

A major portion of memory latency, i.e., memory access time, is the latency of the network that interconnects the multiprocessors, memory, and input/output modules of multiprocessor computer systems. Regardless of whether the interconnect network is a fully interconnected switching network or a shared bus, the time it takes for a memory request to travel between a processor and system memory is directly added to the actual memory operational latency. Interconnect latency includes not only the actual signal propagation delays, but overhead delays such as synchronization of the interconnect timing environment with the interconnect arbitration, which increases rapidly as processors are added to a multiprocessor system.

Recent attempts to improve memory latency have involved distributing system memory so that it is closer to the processors requiring access to the memory. This has led to sharing data in system memory, which, in turn, has required the implementation of coherency schemes. In the past system memory coherency schemes have been implemented in software. Because they have been implemented in software they have been slow. Further, system memory sharing requires that large data granules be transferred. Large data granules take up large parts of system memory, require large amounts of interconnect bandwidth to transfer from one memory location to another, and are more likely to be referenced by a large number of processors than smaller data granules. The present invention is directed to providing a multiprocessor computer system that overcomes these disadvantages.

SUMMARY OF THE INVENTION

The present invention is directed to providing a multiprocessor system that overcomes the problems outlined above. More specifically, the present invention is directed to providing a multiprocessor computer system wherein system memory is broken into sections, denoted coupled memory, and distributed throughout the system such that a coupled memory is closely associated with each processor. The close association improves memory latency and reduces the need for system interconnect bandwidth. Coupled memory is not cache memory. Cache memory stores replications of data stored in system memory. Coupled memory is system memory. As a general rule, data stored at one location in coupled memory is not replicated at another coupled memory location. Moreover, the granular size of data stored in caches, commonly called blocks of data, is considerably smaller than the granular size of data stored in system memory, commonly called pages. Coupled memory is lower in cost since it does not provide the high performance of cache memory. Coupled memory is directly accessible by its associated processor, i.e., coupled memory is accessible by its associate processor without use of the system interconnect. More importantly, while coupled memory is closely associated with a specific processor, unlike a cache, coupled memory is accessible by other system processors via the system interconnect. In addition to coupled memory, system memory may include global memory, i.e., memory not associated with a processor, but rather shared equally by all processors via the system interconnect. For fast access, frequently used system memory data are replicated in caches associated with each processor of the system. Cache coherency is maintained by the system hardware.

More specifically, in accordance with this invention, a coherent coupled memory multiprocessor computer system that includes a plurality of processor modules, a global interconnect, an optional global memory and an input/output subsystem is provided. Each processor module includes a processor, cache memory, cache memory controller logic, coupled memory, coupled memory control logic and a global interconnect interface. The coupled memory associated with each specific processor and global memory, if any, form system memory, i.e., coupled memory like global memory is available to other processors. Coherency between similar (i.e., replicated) data stored in specific coupled memory locations and both local and remote caches are maintained by either write-through or write-back cache coherency management protocols. The cache coherency management protocols are implemented in hardware, i.e., logic, form and, thus, constitute a part of the computer system hardware.

In embodiments of the invention incorporating a write-through cache coherency management protocol, each time a memory reference occurs, the protocol logic determines if the read or write is of local or remote origin and the state of a shared bit associated with the related system memory location. The shared bit denotes if the data or instruction at the addressed coupled memory location has or has not been shared with a remote processor. Based on the nature of the command (read or write), the source of the command (local or remote) and the state of the shared data bit (set or clear), the write-through protocol logic controls the invalidating of cache-replicated data or instructions and the subsequent state of the shared bit. Thereafter, the read or write operation takes place.

Embodiments of the invention incorporating a write-back cache coherency management protocol also determine if a read or write is of local or remote origin. The protocol logic also determines the state of shared and exclusive bits associated with the addressed coupled memory location. Based on the nature of the command (read or write), the source of the command (local or remote) and the state of the shared and exclusive bits (set or clear), the write-back protocol logic controls the invalidating of cache-stored data, the subsequent state of the shared and exclusive bits and the supplying of data to the source of read commands or the writing of data to the coupled memory. The write-back cache coherency management protocol logic also determines the state of an ownership bit associated with replicated data stored in caches and uses the status of the ownership bit to control the updating of replicated data stored in caches.

BRIEF DESCRIPTION OF THE DRAWINGS

The foregoing and other features and advantages of this invention will become better understood by reference to the following detailed description of preferred embodiments of the invention when taken in conjunction with the accompanying drawings, wherein.

DETAILED DESCRIPTION OF THE PREFERRED EMBODIMENT

Figure 1:
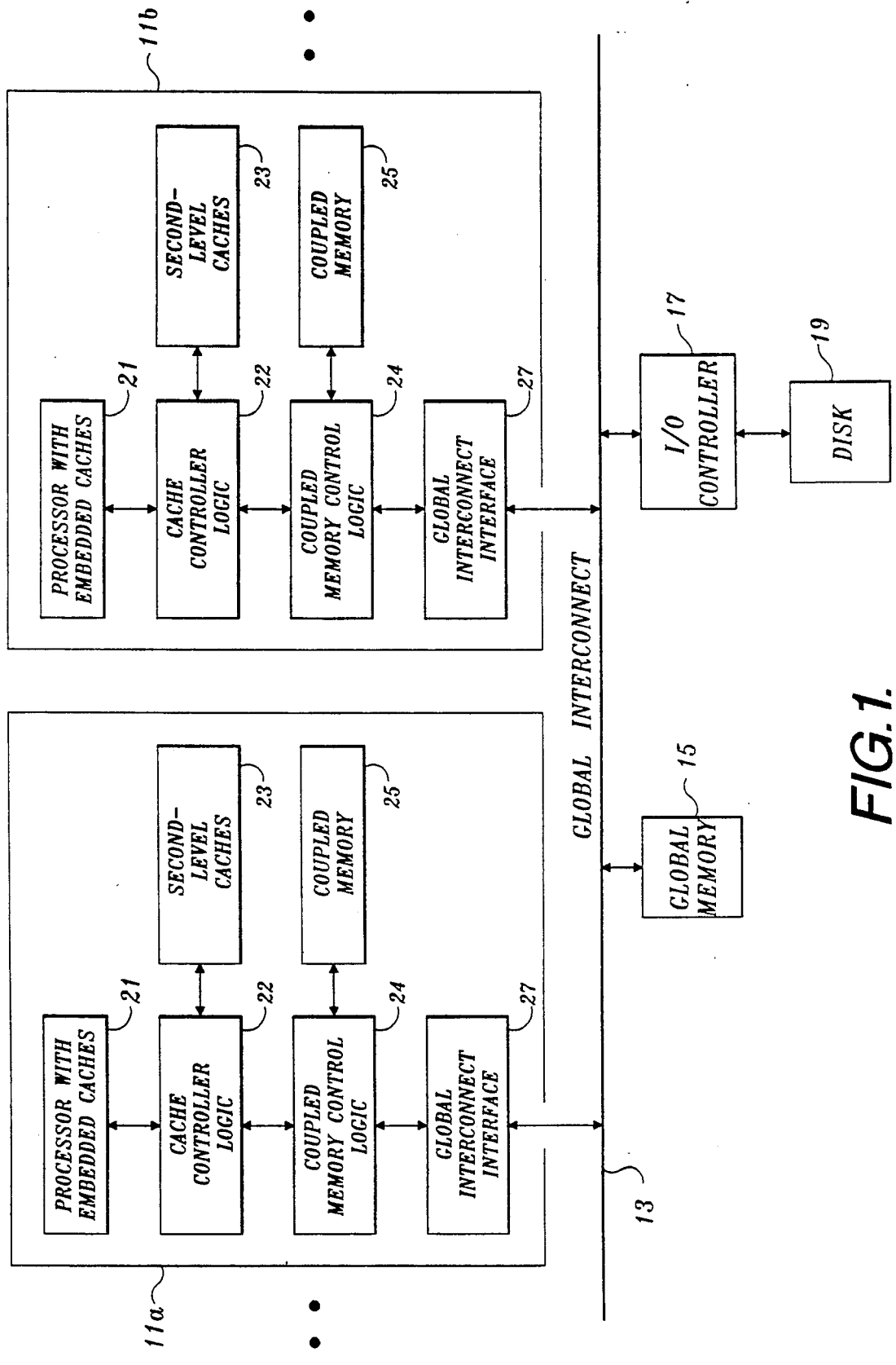
FIG. 1 is a block diagram of a coherent coupled memory multiprocessor system formed in accordance with this invention.

As will be better understood from the following description, the invention is directed to a coherent coupled memory multiprocessor computer system. As shown in FIG. 1, a coupled memory multiprocessor computer system formed in accordance with this invention includes a plurality of processor modules 11a, 11b . . ., a global interconnect 13, an optional global memory 15 and an input/output (I/O) subsystem, which may comprise an I/O controller 17 and disk storage media 19. The global interconnect may be a bus, a switch or any other suitable mechanism for interconnecting a plurality of processor modules. Each processor module 11a, 11b . . . includes: a processor 21, preferably with an embedded cache; one or more second-level caches 23;

cache controller logic 22; coupled memory control logic 24; coupled memory 25; and a global interconnect interface 27. The cache controller logic controls processor access to the second level caches 23 and to the coupled memory 25, via the coupled memory control logic 24. The global interconnect 13 is connected to the global interconnect interface 27. The global interconnect interface 27 is also connected to the coupled memory control logic 24. Thus, the coupled memory control logic 24 also couples the global interconnect interface 27 to the coupled memory 25. The coupled memory control logic also couples the global interconnect interface to the processor caches and to the second level caches 23 via the cache control logic.

As a result, all processors have access to all system memory, i.e., all coupled memory and all global memory, if any. The coupled memory, and the global memory 15, if any, are accessed and function in the same manner as the traditional main or system memory of prior art single and multiprocessor computer systems, the main difference being that the coupled memory portion of the system memory is closely associated with a specific processor. "Closely associated" means that the coupled memory 25 is directly accessible by its related processor 21, i.e., accessible without use of the global interconnect 13.

Preferably, coupled memory is mounted on the same computer system card as the processor with which the coupled memory is associated. In essence, the coupled memory is a range of addresses in the overall computer system's physical address space, with the address range being a function of the associated processor's identification number. If additional system memory is required for a given application, it can be supplied in the form of global memory modules in a manner that is analogous to the addition of memory in a traditional shared memory multiprocessor computer system. As noted above, the coupled memory of a coherent coupled memory multiprocessor computer system formed in accordance with this invention is homogeneous in that any processor can access any memory location, regardless of whether it is located in coupled or global memory, by addressing a memory request to the appropriate memory.

Coupled memory differs from cache memory in that coupled memory is "real" memory. Coupled memory is not designed to store a quickly accessible copy of data that is also stored at some other location in the main memory of the computer system, i.e., coupled memory is not cache memory. Since coupled memory is usable system memory, an equivalent coupled memory implementation of a computer system will have a lower system cost than a cache-based computer system implementation of similar total memory capacity. The lower cost results from the fact that coupled memory information does not replicate information at other system memory locations and because coupled memory is less expensive than large, high-performance cache memory. Moreover, because it is usually desirable to make coupled memory as large as possible, coupled memory is generally implemented using larger, slower memory devices as opposed to the smaller, faster memory devices preferred for cache memory.

Because coupled memory is accessible via its associated processor without using the global interconnect, the memory latency of local coupled memory is low. In addition to the benefit of much lower main memory latency, coupled memory offers the potential for greatly reduced global interconnect traffic. Global interconnect traffic is reduced for applications that confine their memory access to the coupled memory associated with the processor on which the application or task is running. Reduced global interconnect traffic allows computer system designers to greatly increase the processing capability of a given multiprocessor computer system or use a more economical, lower-performance global interconnect for a given amount of processing capability. Overall system performance is also improved because the coupled memory associated with each processor of a coupled memory multiprocessor computer system allows parallel access to several regions of the system's overall memory without the need for additional global interconnect capacity.

All of the elements of the processor modules 11a, 11b ... illustrated in FIG. 1 can be implemented using the current state of semiconductor technology on a printed circuit board (PCB) roughly the size of a sheet of notepaper. As noted above, such a PCB would include a high-speed, very large scale integrated (VLSI) circuit microprocessor with internal instructions and data caches, a large, fast cache subsystem, a sizable DRAM-based coupled memory and a VLSI global interconnect interface. When a cache miss occurs, the coupled memory 25 is accessible in roughly one-third to one-eighth the time it would take to access a remote memory, such as the global memory 15, using the global interconnect. Reduced coupled memory latency is due to one or more of several factors. Because the coupled memory logic is part of the processor/cache clock domain, there are few, if any, synchronization delays. The signal path to coupled memory is far shorter than the signal path to memory accessed via the global interconnect. There are few, if any, arbitration delays in accessing coupled memory. Coupled memory can be accessed in parallel with associated cache memory in order to reduce the overall access time in the event of a cache miss, without interfering with the operation of other computer system processors or input/output interfaces.

Depending upon the cost/performance goals of a coherent coupled memory multiprocessor computer system formed in accordance with the invention, either a write-through or a write-back cache coherency management protocol is used to maintain coherency between data and instructions stored in coupled memory and cache-stored data and instructions. Regardless of which protocol is chosen, the protocol is implemented in the hardware of the multiprocessor computer system. Preferably, the chosen cache coherency management protocol is implemented in the coupled memory control logic 24 and the cache controller logic 22, as required. More specifically, the chosen protocol forms a state machine that is included in the coupled memory control logic and the cache controller logic in the manner described below. The cache management protocol being invisible to programmers programming tasks to be run on a coherent coupled memory multiprocessor computer system formed in accordance with this invention. More specifically, incorporating the cache coherency management protocols in the coupled memory control logic eliminates the need for task programmers to program the housekeeping duties necessary to maintain coherency between data stored at different locations in the computer system. Thus, programming complexity is reduced.

As noted above, the present invention contemplates the use of either write-through or a write-back cache coherency management protocol. Since a write-through cache coherency management protocol requires somewhat less logic to implement, albeit at a lower performance level, it is best suited for less expensive, lower-performance systems. Contrariwise, a write-back cache coherency management protocol delivers higher performance, albeit with more logic. As a result, a write-back cache coherency management protocol is best suited to higher-performance, higher-cost computer systems.

Figure 3:
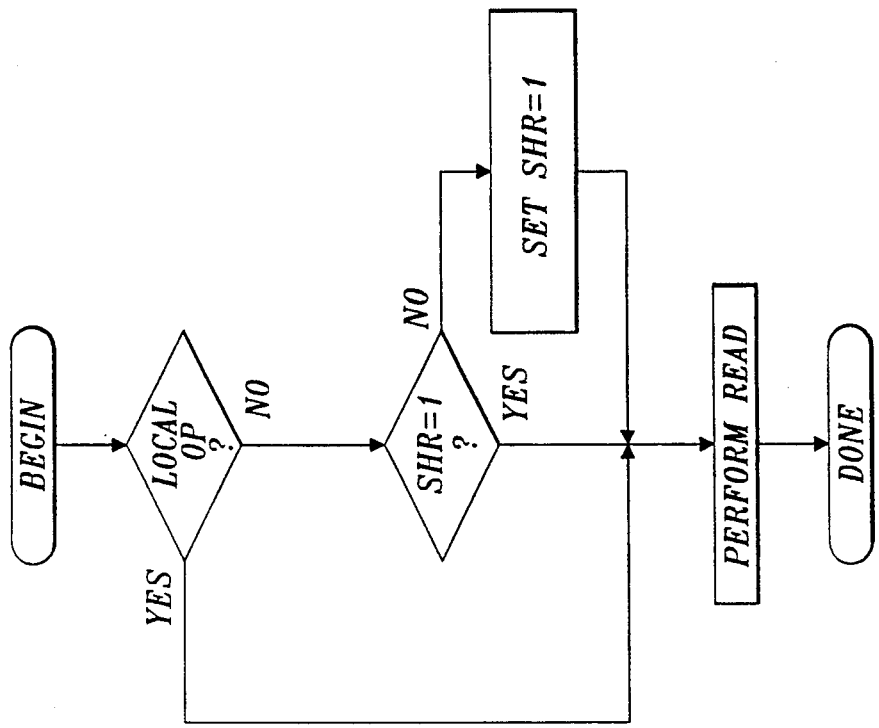
FIG. 3 is a flow diagram illustrating the read operation of a write-through cache coherency management protocol suitable for use in embodiments of the invention.
Figure 2:
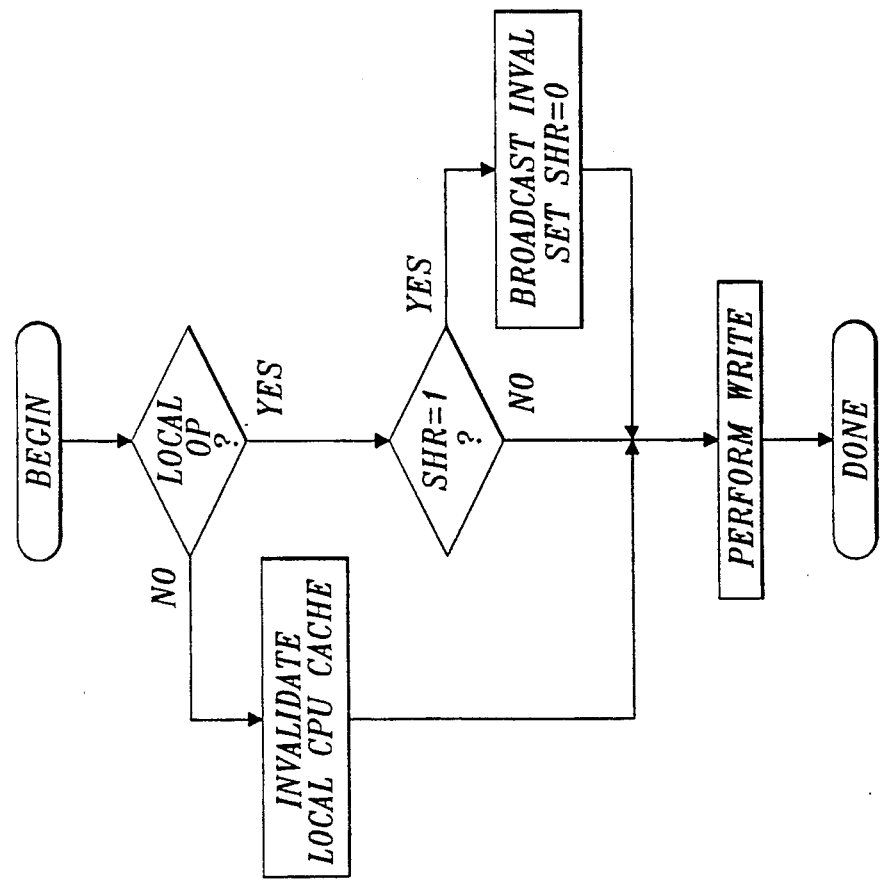
FIG. 2 is a flow diagram illustrating the write operation of a write-through cache coherency management protocol suitable for use in embodiments of the invention.
Figure 4:
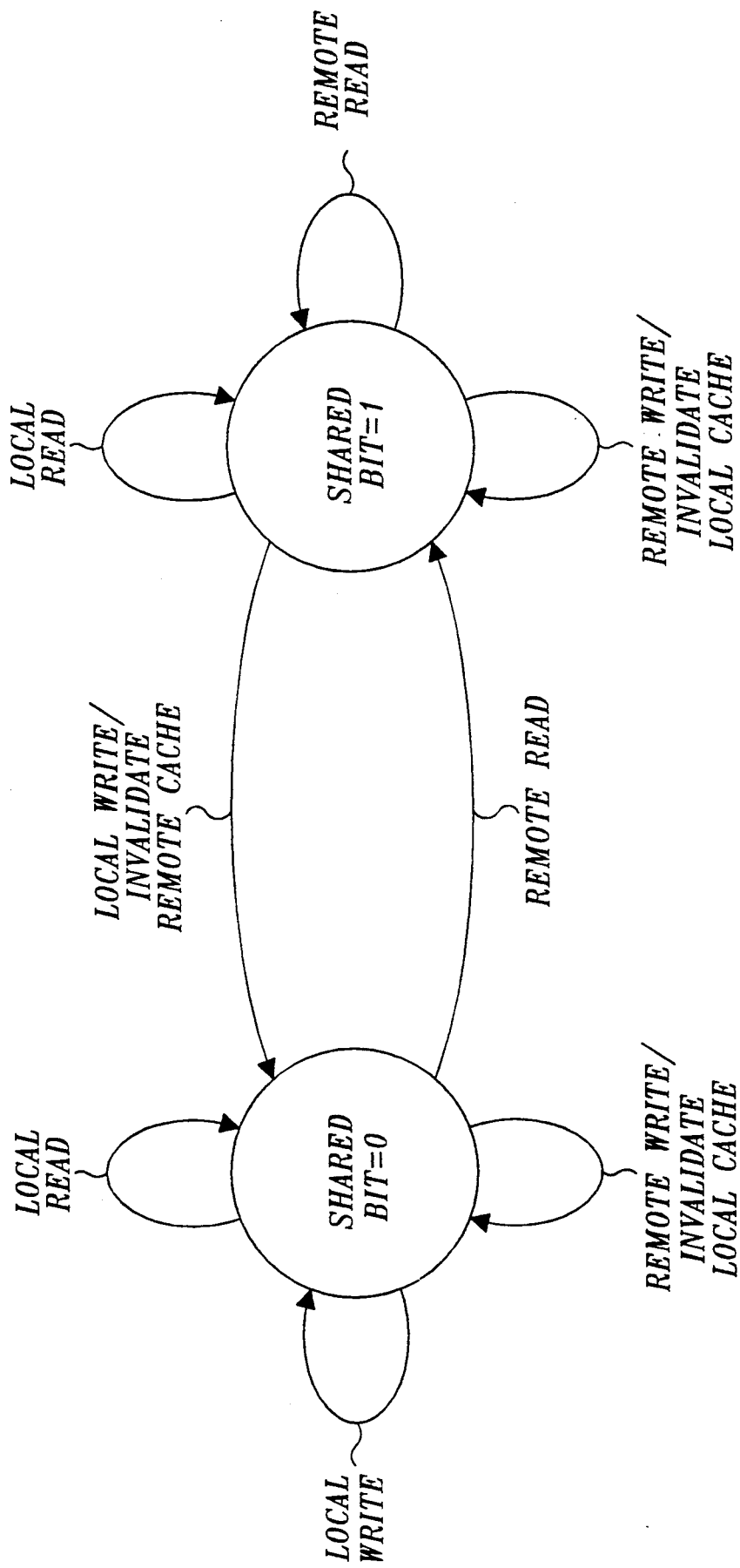
FIG. 4 is a state diagram illustrating the logic used to carry out the write-through cache coherency management protocol illustrated in FIGS. 2 and 3.

FIGS. 2, 3, and 4 illustrate in flow diagram (FIGS. 2 and 3) and state diagram (FIG. 4) form a write-through cache coherency management protocol suitable for use in the embodiment of the invention illustrated in FIG. 1. The underlying concept of a write-through cache coherency management protocol is that unshared coupled memory locations can be read and written by the coupled processor, i.e., the processor connected to the coupled memory, without the need to broadcast this activity to other cache memories of the computer system. Only coupled memory locations containing data that has been shared with remote caches of the computer system require an invalidating broadcast. Determining whether or not data stored in a coupled memory location have been shared is controlled by adding a state bit, designated a shared (SHR) bit, to each cache block sized coupled memory location. The coupled memory location shared bit indicates whether or not a copy of the data contained at that coupled memory location exists in a remote system cache. If the data have been shared, the shared bit is set (SHR=1). If the data have not been shared, the shared bit is clear (SHR=0). All coupled memory location shared bits are set to the unshared or clear state at system initialization.

In the following description, a request issued by the local processor is termed a "local" request, while a request issued by a remote processor or input/output processor is termed a "remote" request. FIG. 2 illustrates the functions performed by the coupled memory control logic implementing a write-through cache coherency management protocol when a write request occurs, and FIG. 3 illustrates the functions that are performed when a read request occurs.

As illustrated in FIG. 2, if the write request is from a remote source, the local cache is searched and cache data that replicate data at the addressed coupled memory location is invalidated if a "hit" occurs, which implies that the shared bit is cleared. Then the write operation is performed. If the write request is of local origin, the shared bit associated with the addressed coupled memory location is read. If the data at the addressed memory location has been shared, an "invalidate cache data replicated in remote caches" is broadcast over the global interconnect. Then, the shared bit is cleared, i.e., set to zero. Thereafter, the write is performed.

As shown in FIG. 3, if the source of a read request is local, the shared bit associated with the addressed memory location is left unaltered and the read is performed. If the source of the read request is remote, the shared bit associated with the addressed memory location is tested. If it is not set, the shared bit is set. Thereafter, the read operation is performed.

FIG. 4 is a state diagram illustrating the logic for carrying out the write and read operations of a write-through cache coherency management protocol of the type illustrated in FIGS. 2 and 3. The shared bit of each associated coupled memory location is placed in the unshared, i.e., binary zero, state when the coherent coupled memory multiprocessor system is initialized.

The shared bit remains in the unshared state when local reads and writes occurred. The shared bit transitions to the shared state only when a remote read occurs. Thereafter, the shared bit remains in the shared state if local or remote reads occur. The shared bit transitions back to the unshared state if a local write occurs. At the same time, an invalidate remote cache is broadcast on the global interconnect, which results in a valid/invalid data bit associated with the related cache data or instruction block being placed in an invalid state. The shared bit state remains unchanged when remote write-/invalidate cache memory operations take place. Read and write requests to the global memory 15 are always treated as remote requests by either the write-through cache coherency management protocol illustrated in FIGS. 2-4 or the write-back cache coherency management protocol illustrated and described below.

Figure 6:
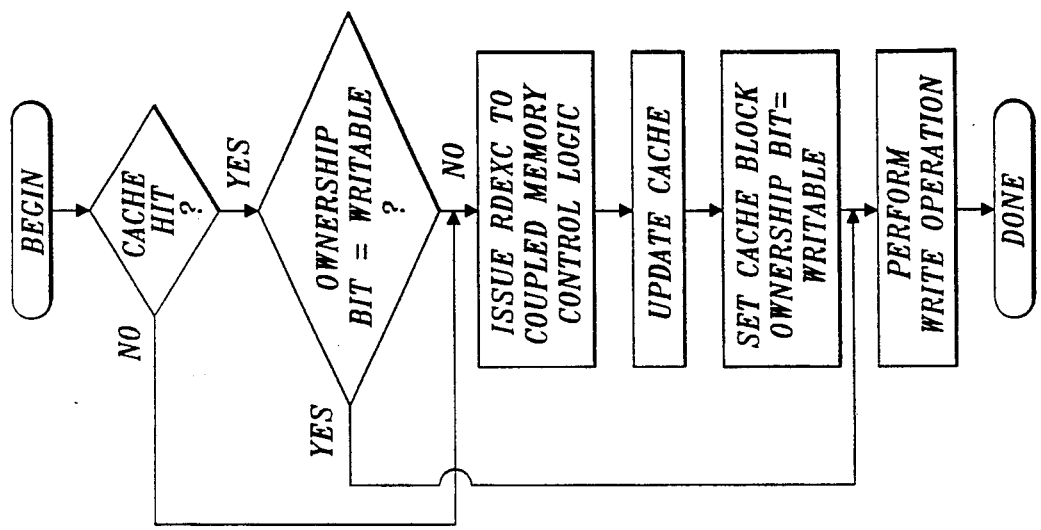
FIG. 6 is a flow diagram illustrating a processor cache write request of a write-back cache coherency management protocol suitable for use in embodiments of the invention.
Figure 5:
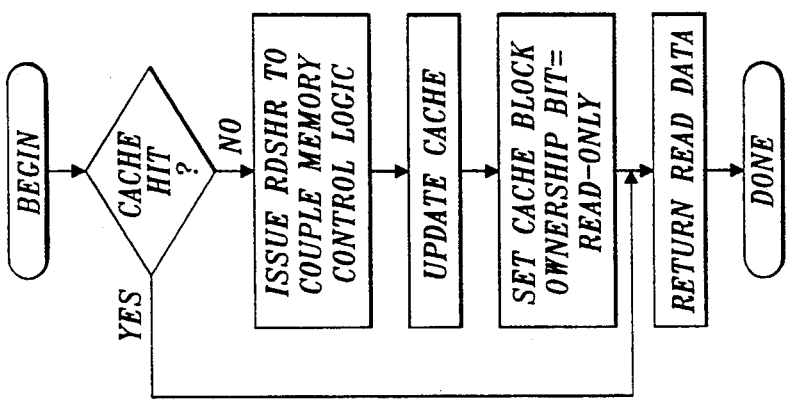
FIG. 5 is a flow diagram illustrating a processor cache read request of a write-back cache coherency management protocol suitable for use in embodiments of the invention.

The write-back cache coherency management protocol requires that each block of cache data include an ownership bit. The ownership bit has two states—a READ-ONLY state and a WRITABLE state. The ownership bit state controls whether the block of data can be written, i.e., updated, or only read. In order to be written, the cache block must be owned. In order to be owned, an exclusive bit associated with the related coupled memory location and described below must be set. The exclusive bit advises other processors attempting to obtain data from the associated coupled memory location that the coupled memory data is stale and that current data is located in a cache. Flow diagrams illustrating the sequence of actions carried out by the cache controller logic when processor cache read and write requests occur are illustrated in FIGS. 5 and 6, respectively. A state diagram showing how the cache controller logic functions is illustrated in FIG. 7.

As shown in FIG. 5, when a processor cache read request occurs, if the data is in the cache, the data is read. If the data is not in the cache, i.e., a cache miss occurs, a read share (RDSHR) instruction, which is more fully described below, is issued to the coupled memory location containing the desired data. This causes a copy if the data to be transferred to the cache associated with the processor requesting the read. Data is transferred to the cache based on the presumption that once data is requested by a processor, it will be requested again. As noted above, data stored in a cache can be accessed more rapidly than data stored in system memory, including the coupled memory associated with a particular processor. Simultaneously, the ownership bit associated with the cache block is set to the READ-ONLY state and the data is sent to the requesting processor.

As shown in FIG. 6, when a processor cache write request occurs, if the requested data is in the cache and if the ownership bit is in the WRITABLE state, the write operation is performed. If the requested data is not in the cache or if in the cache but the ownership bit is not in the WRITABLE state, a read exclusive (RDEXC) instruction (described below) is issued to the coupled memory control logic associated with the coupled memory containing the data to be written, i.e., updated. As described below, the RDEXC instruction causes an exclusive bit associated with the related coupled memory location to denote that the coupled memory data or instruction is stale and that updated data or instructions are located in a cache. Then, the cache block is updated (if necessary) and the cache block ownership bit is set to the WRITABLE state. Thereafter, the write operation is performed.

Figure 7:
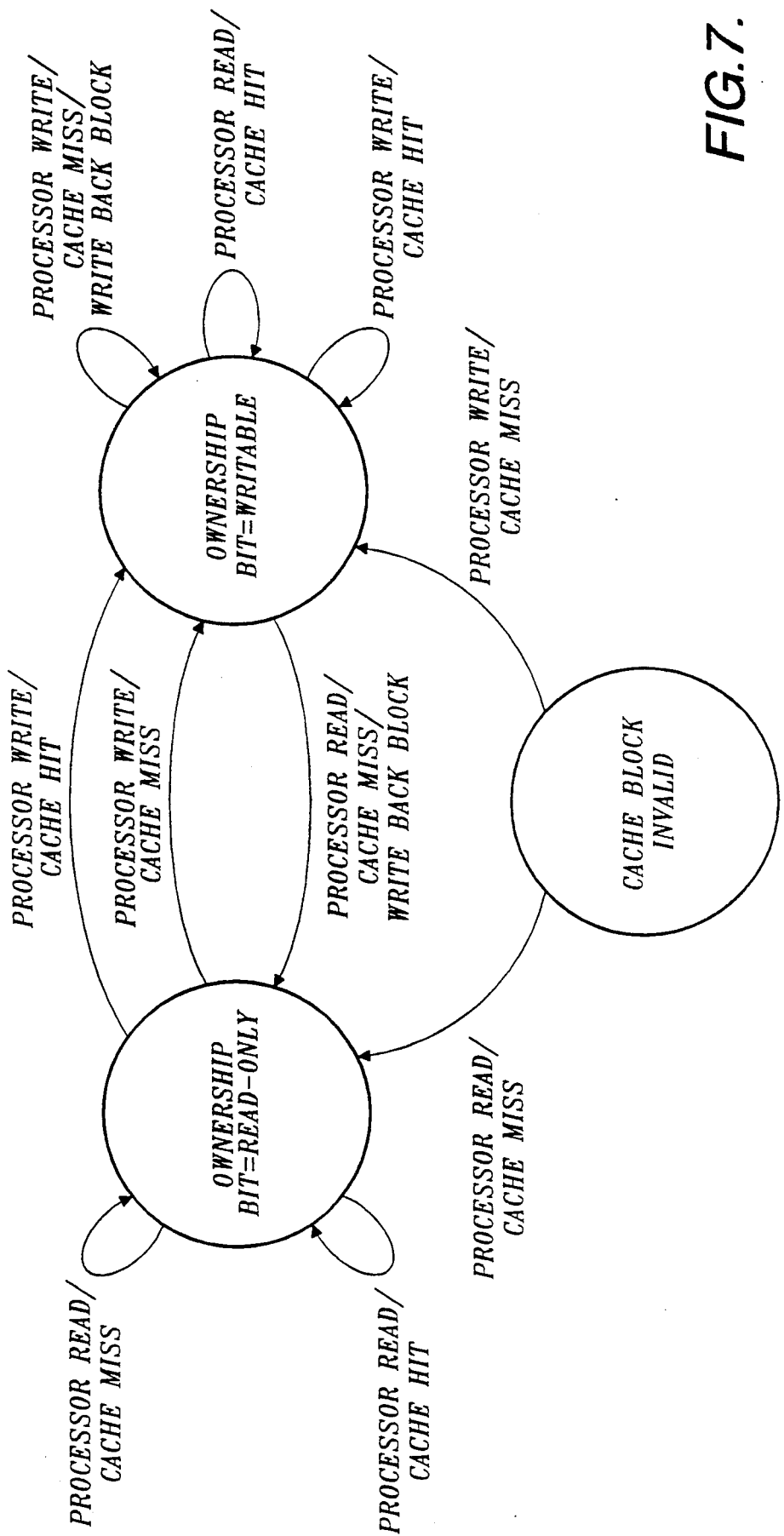
FIG. 7 is a state diagram illustrating the logic used to carry out the processor cache read and write requests illustrated in FIGS. 5 and 6.

FIG. 7 is a state diagram illustrating how the cache controller logic carries out the functions illustrated in FIGS. 5 and 6. As usual with write-back caches, when the computer system is initialized, all cache blocks are designated invalid. Until the invalid bit is set to a valid state, the status of the ownership bit is meaningless. The first processor request for access to data or instructions in a particular cache block is by definition a miss. If the processor request is a read request, the ownership bit is set to the read-only state and the read functions illustrated in FIG. 5 are performed. If the request is a write request, the ownership bit is set to the writable state and the functions illustrated in FIG. 6 are performed.

If the ownership bit is in the READ-ONLY state when a processor read request occurs, the ownership bit remains in the READ-ONLY state regardless of whether a cache hit or miss occurs. If the ownership bit is in the READ-ONLY state when a processor write occurs, the ownership bit transitions to the WRITABLE state regardless of whether a cache hit or miss occurs. If the ownership bit is in the WRITABLE state and a cache hit occurs, the ownership bit remains in the WRITABLE state regardless of whether the request is a processor read or write. If the ownership bit is in the WRITABLE state when a processor write and a cache miss occur, the addressed block of data or instructions is written back into coupled memory and the ownership bit remains in the WRITABLE state. Finally, if the ownership bit is in the WRITABLE state when a processor read and a cache miss occur, the addressed block of data or instructions is written back into coupled memory and the ownership bit is set to the READ-ONLY state. In the latter two cases, when the data or instructions are written back, as shown in FIGS. 5 and 6 and discussed above, the desired data or instructions are loaded into the addressed cache block, i.e., the cache block is updated.

FIGS. 8, 9, 10 and 11 illustrate a write-back cache coherency management protocol in flow diagram (FIGS. 8, 9 and 10) and state diagram (FIG. 11) form. As noted above, the advantage of a write-back cache coherency management protocol over a write-through cache coherency management protocol is that successive writes of shared data do not require that cache invalidates be broadcast on the global interconnect. Consequently, such writes do not consume global interconnect bandwidth. A write-back cache coherency management protocol of the type illustrated in FIGS. 8-11 can be termed an "ownership" protocol because a processor or an input/output interface must first acquire exclusive ownership of data before it can write to the data, i.e., change the data. Once ownership is acquired, multiple writes can be performed with no further overhead being required, i.e., no further actions taking place. Whether a cache block is owned and thus writable, or only readable, is denoted by the ownership bit illustrated in FIGS. 5-7 and described above. As with the write-through cache coherency management protocol illustrated in FIGS. 2-4, the write-back cache coherency management protocol illustrated in FIGS. 8-11 local references to unshared coupled memory do not require the use of the global interconnect.

The write-back cache coherency management protocol illustrated in FIGS. 8-11 requires the addition of two state bits to each cache block sized unit of coupled memory—an exclusive (EXCL) bit and a shared (SHR) bit. Three of the four possible states of these bits are used. When data are not cached remotely, both the shared and exclusive bits are in clear states (SHR=0, EXCL=0). When data are cached remotely for read, the shared bit is set (SHR=1) and the exclusive bit is clear (EXCL=0). When data are cached remotely for write, the shared bit is clear (SHR=0) and the exclusive bit is set (EXCL=1). The remaining condition, i.e., both shared and exclusive bits set, is not used. At system initialization, all shared and exclusive bits are clear, which sets all coupled memory locations to the data not cached remotely state.

As noted above, the write-back cache coherency management protocol illustrated in FIGS. 8-11 assumes that an ownership state bit is associated with each cache memory block in each system cache memory. The READ-ONLY state of the ownership bit indicates that the associated data is a shared READ-ONLY copy of data located at an associated coupled (or global) memory location. The WRITABLE state indicates that the memory location is exclusively owned by the cache and that the cache data may be written, i.e., modified. As also noted above, when a processor performs a write to a cache memory location, the cache block ownership bit is interrogated. If the cache block ownership bit is in the READ-ONLY state, the write-back cache coherency management protocol must first obtain ownership of the associated coupled (or global) memory location before the write can take place. Later, when the cache block is to be displaced from the cache, i.e., overwritten, the cache ownership bit is interrogated. If the cache ownership bit is in the WRITABLE state, the block of cache data must be written back to its associated coupled or global memory location and the coupled memory location status bits set to data not cached remotely states before the cache data block can be overwritten.

Figure 8:
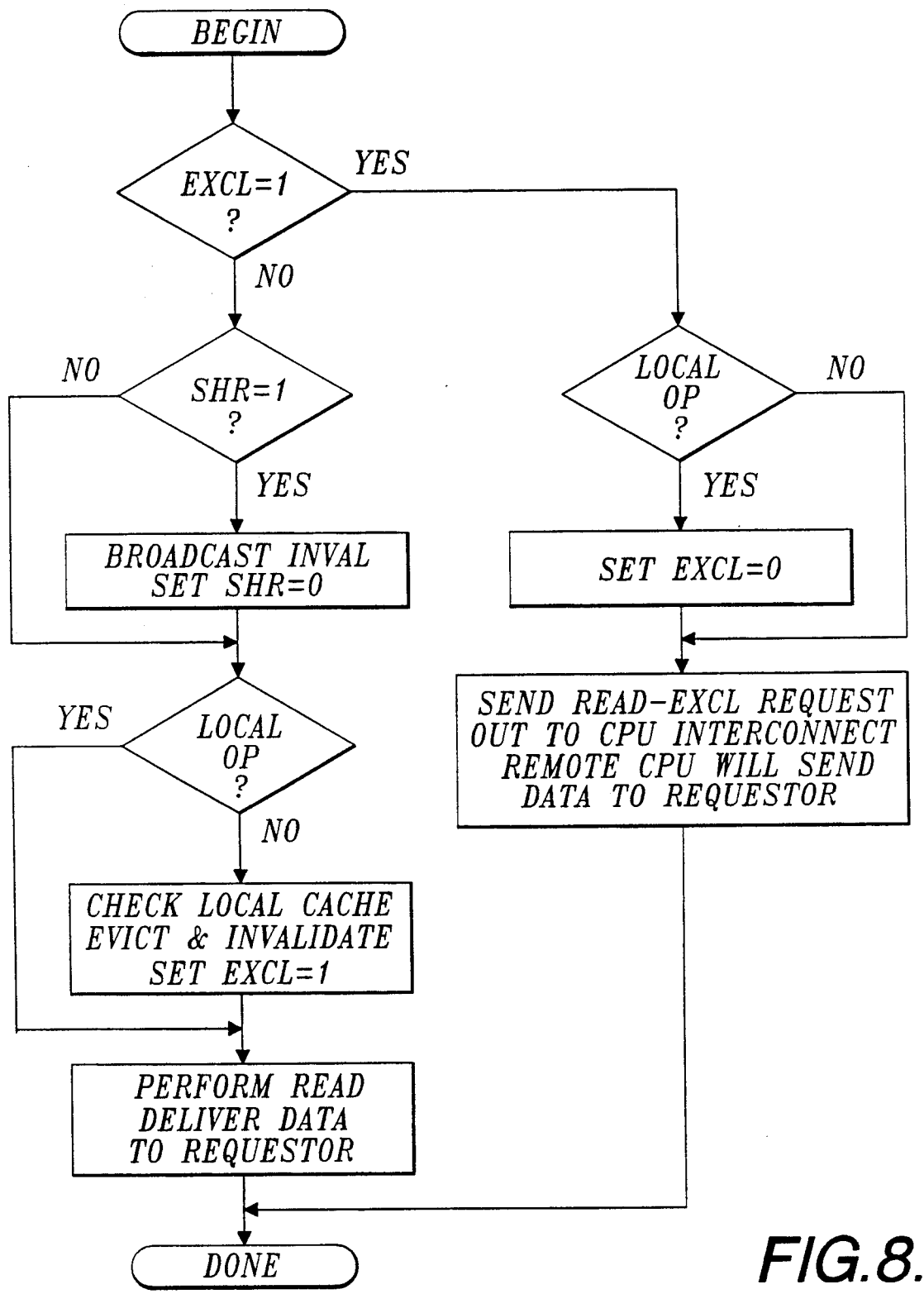
FIG. 8 is a flow diagram of the read-exclusive operation of a write-back cache coherency management protocol suitable for use in embodiments of the invention.
Figure 9:
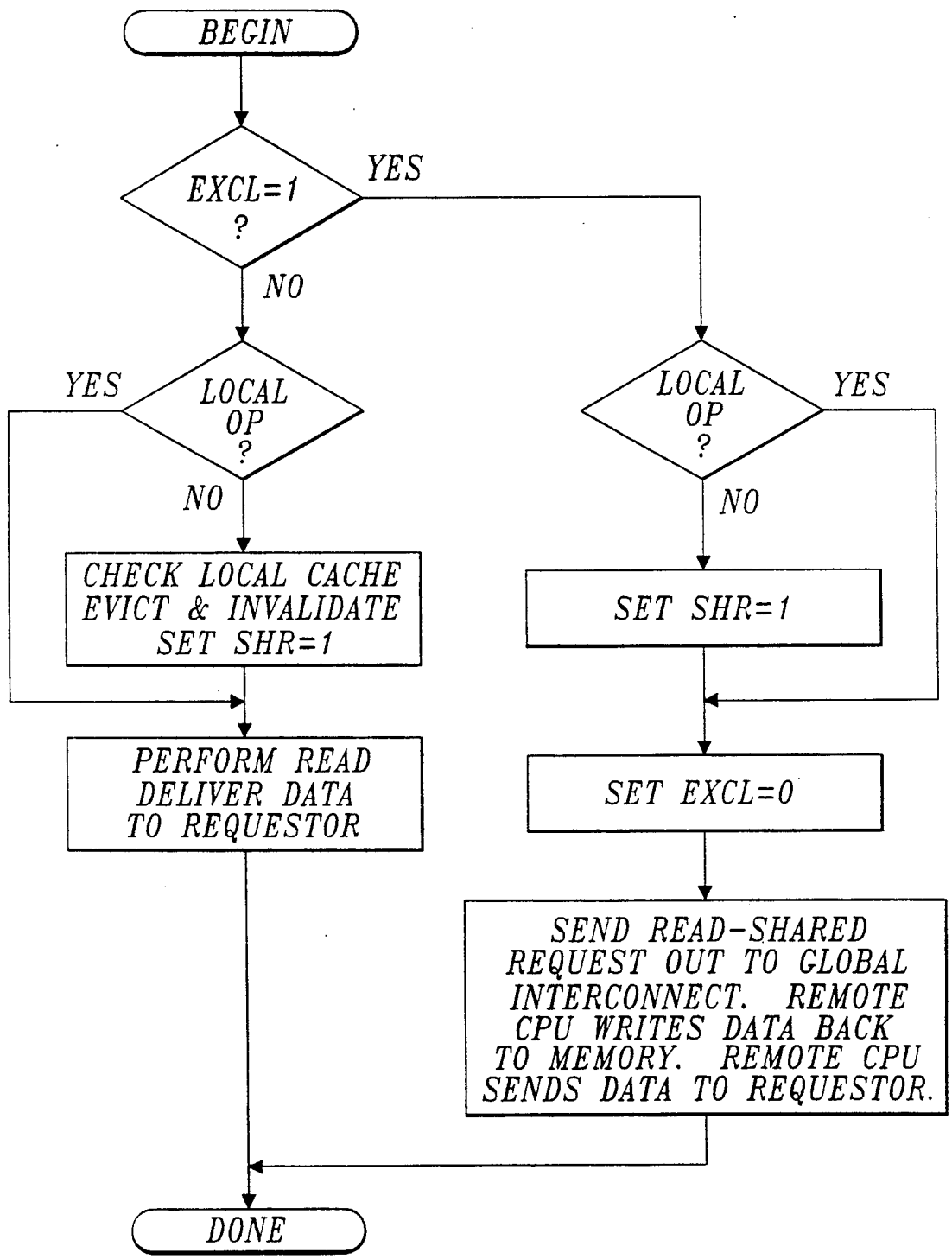
FIG. 9 is a flow diagram of the read-shared operation of a write-back cache coherency management protocol suitable for use in embodiments of the invention.
Figure 10:
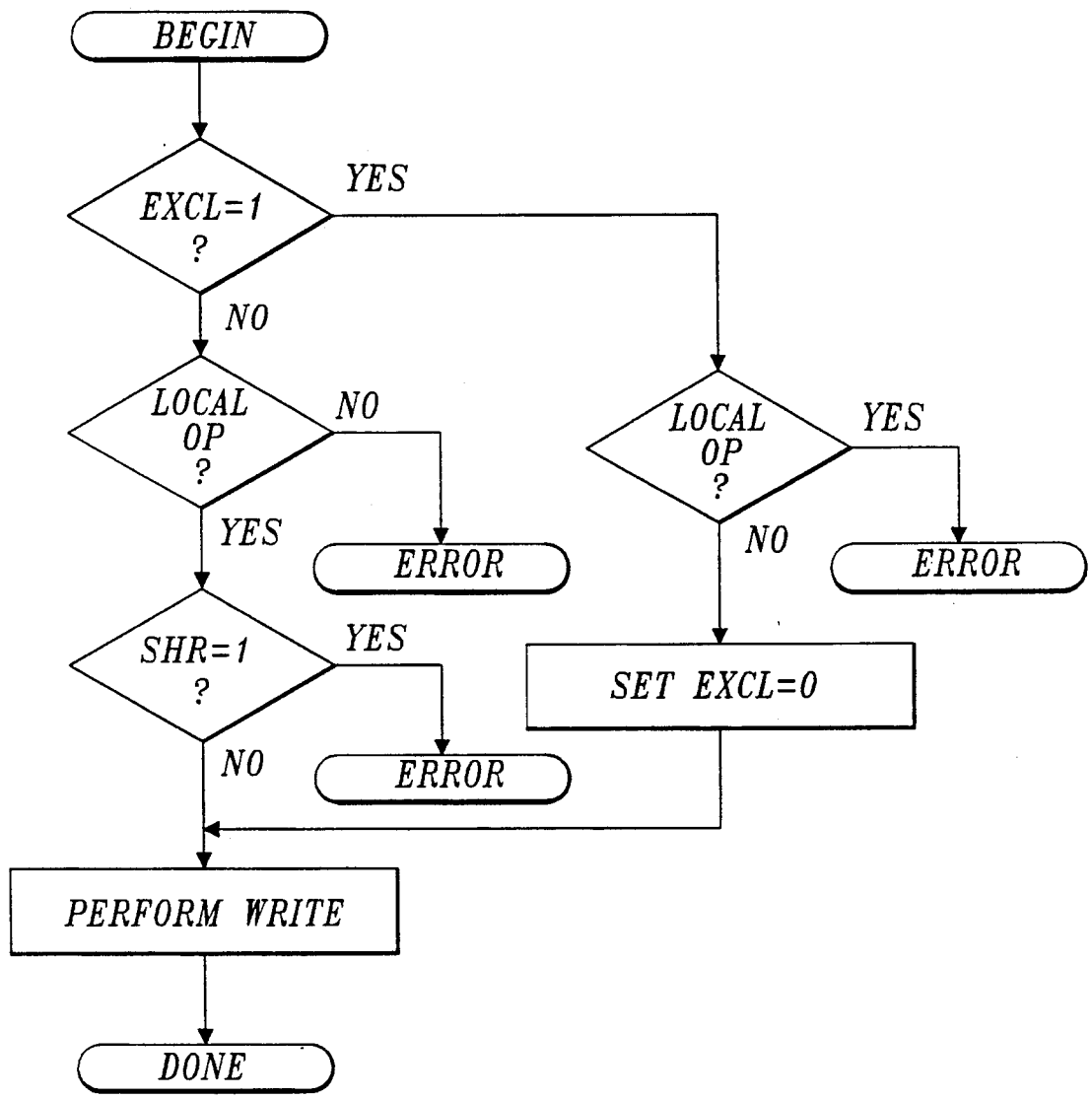
FIG. 10 is a flow diagram of a write-unowned operation of a write-back cache coherency management protocol suitable for use in embodiments of the invention.
Figure 11:
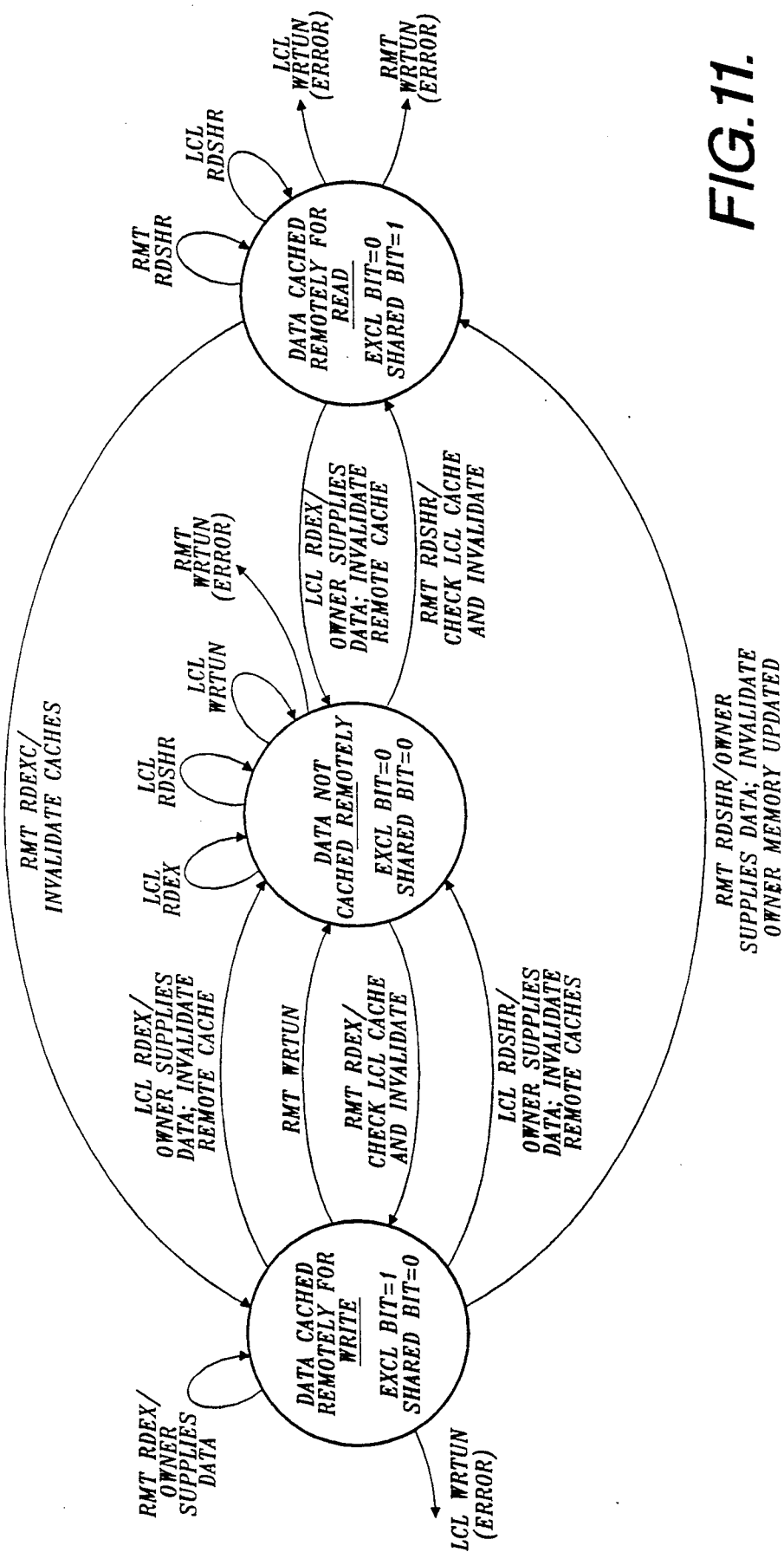
FIG. 11 is a state diagram illustrating the logic used to carry out the write-back cache coherency management protocol illustrated in FIGS. 8–10.

As noted above, FIGS. 8, 9 and 10 are flow diagrams illustrating a write-back cache coherency management protocol suitable for use in the embodiment of the invention illustrated in FIG. 1. More specifically, FIGS. 8, 9 and 10 are read-exclusive, read-share and write-unowned flow diagrams of a write-back cache coherency management protocol suitable for use by the invention. As noted above, while disclosed in flow diagram form, the write-back cache coherency management protocol illustrated in FIGS. 8, 9 and 10 is implemented in logic form in the coupled memory control logic 24 of the processor modules 11a, 11b ... FIG. 11 is a state diagram illustrating the logic implementation. Read exclusive is used when a processor needs to modify the data stored at a particular coupled (or global) memory location. Read exclusive ensures that no other system cache has a stale copy of the data stored at the related coupled (or global) memory location. Read shared is used when a processor requires a read-only copy of data at a particular coupled (or global) memory location, e.g., an instruction read. Write unowned is used when a processor wants to write modified data to a coupled (or global) memory location and reuse a particular cache location.

As illustrated in FIG. 8, the coupled memory control logic enters the read-exclusive flow when a read-exclusive command is mapped into an address of the associated coupled memory by a related processor in the manner illustrated in FIG. 6 and described above. Depending on the state of the status bits of the coupled memory location and whether the request is local or remote, various actions can take place. If the status bits of the corresponding coupled memory location are in the data cached remotely for write state (SHR=0, EXCL=1), the status bits remain unchanged if the request is remote. Contrariwise, the status bits are set to the data not remotely cached state (SHR=0, EXCL=0) if the request is local. Either way, a read-exclusive request is broadcast on the global interconnect, which forces the remote cache containing valid data to send its data to the requester and terminate the operation.

If the status bits of the corresponding coupled memory location are in the data cached remotely for read state (SHR=1, EXCL=0), regardless of whether the request is local or remote, an invalidate command is broadcast on the global interconnect. This broadcast invalidates all other read-only copies of the memory location data contained in remote caches. The sequence of operation then continues as if the status bits were in the data not cached remotely state (SHR=0, EXCL=0).

If the status bits of the corresponding coupled memory location are in the data not cached remotely state (SHR=0, EXCL=0) and the request is remote, the local cache copy is written to the coupled memory and then invalidated, as necessary, and the status bits of the coupled memory location are set to the data cached remotely for write state (SHR=0, EXCL=1). If the request is local, the coupled memory remains in the data not cached remotely state (SHR=0, EXCL=0). Regardless of whether the request is local or remote, a coupled memory read operation is performed, the data delivered to the requester and the operation concluded.

The coupled memory control logic enters the read-shared flow illustrated in FIG. 9 when a read-shared ownership bit set in the manner illustrated in FIG. 5 and described above maps into the associated coupled memory address space. Depending on the state of the coupled memory location and whether the request is local or remote, various actions can take place. If the status bits of the corresponding coupled memory location are in the data cached remotely for write state (SHR=0, EXCL=1), the status bits of the coupled memory location transition to the data cached remotely for read state (SHR=1, EXCL=0) for a remote request and to the data not remotely cached state (SHR=0, EXCL=0) for a local request. Either way, a read-shaped request is broadcast on the global interconnect, forcing the remote cache with valid data associated with the memory location to copy the data to the coupled memory, send the data to the original requester and end the operation.

If the status bits of the corresponding coupled memory location are in the data cached remotely for read (SHR=1, EXCL=0) or data not cached remotely (SHR=0, EXCL=0) states and the request is remote, the local cache is forced to write its modified copy of the data to the coupled memory location, provided the corresponding cache location's ownership bit is in the writable state. The status bits of the coupled memory location are then set to the data cached remotely for read state (SHR=1, EXCL=0). Regardless of whether the request is local or remote, the coupled memory is read and the data delivered to the requester. Thereafter, the operation is terminated.

FIG. 10 illustrates the coupled memory control logic flow followed when a write-unowned command is mapped into its associated coupled memory address space. Depending upon the state of the coupled memory location and whether the request is local or remote, various actions can take place. If the status bits of the corresponding coupled memory location are in the data cached remotely for write state (SHR=0, EXCL=1) and the request is remote, the status bits of the coupled memory location are set to the data not cached remotely state (SHR=0, EXCL=0), the data are written to the coupled memory location and the operation terminated. If the status bits of the corresponding coupled memory location are in the data not cached remotely state (SHR=0, EXCL=0) and the request is local, the data are written to the coupled memory location without the status bits being altered, and the operation is terminated.

Certain coupled memory state conditions and local or remote requests cause the write-unowned sequence to be aborted and an error signal to be sent to the coherent coupled multiprocessor system. These conditions include a local request when the status bits of the coupled memory location are in the data cached remotely for write state (SHR=0, EXCL=1); a remote request and the status bits of the coupled memory location in the data cached remotely for read (SHR=1, EXCL=0) or data not cached remotely (SHR=0, EXCL=0) states; or a local request and the status bits of the coupled memory location in the data cached remotely for read state (SHR=1, EXCL=0).

FIG. 11 is a state diagram for the write-back cache coherency management protocol illustrated in FIGS. 8-10. The following abbreviations are used in FIG. 11: LCL and RMT for local and remote commands, respectively; and RDEXC, RDSHR and (WRTUN) for read-exclusive, read-shared and write-unowned commands, respectively.

As will be readily appreciated from the foregoing description the invention provides a coherent coupled memory multiprocessor computer system. Coherency between similar data stored in coupled (or global) memory and caches is maintained by either write-through or write-back cache coherency management protocols implemented in the computer system architecture, specifically the logic used to interface the cache and coupled (or global) memories.

While preferred embodiments of the invention have been illustrated and described, it is to be understood that, within the scope of the appended claims, the invention can be practiced otherwise than as specifically described herein.

The embodiments of the invention in which an exclusive property or privilege is claimed are defined as follows:

1. A coherent coupled memory multiprocessor computer system comprising:
a global interconnect for interconnecting a plurality of processor modules; and
a plurality of processor modules, each of said processor modules including a processor, cache memory, coupled memory, coupled memory control logic and a global interconnect interface, said coupled memory control logic and said global interconnect interface of each of said processor modules coupling said global interconnect and the coupled memory and the cache memory of the processor modules such that said coupled memory can be accessed by the processor associated with the coupled memory without using said global interconnect and such that said coupled memory can be accessed by the processors of other processor modules via said global interconnect, said coupled memory control logic including means for maintaining coherency between data stored in the coupled memory of the associated processor module and data stored in the cache memory of the associated processor module and the cache memories of other processor modules.

2. A coherent coupled memory multiprocessor computer system as claimed in claim 1 wherein said coupled memory control logic coherency maintaining means implements a write-through cache coherency management protocol.

3. A coherent coupled memory multiprocessor computer system as claimed in claim 1 wherein said coupled memory control logic coherency maintaining means implements a write-back cache coherency management protocol.

4. A coherent coupled memory multiprocessor computer system as claimed in claim 1 wherein:
said cache memory stores data in blocks;
said coupled memory includes a plurality of memory locations each equal in size to said cache blocks; and
each coupled memory location includes a shared status bit, said shared status bits denoting whether a copy of the data stored in the related memory location is or is not also stored in a cache.

5. A coherent coupled memory multiprocessor computer system as claimed in claim 4 wherein said coupled memory control logic coherency maintaining means implements a write-through cache coherency management protocol.

6. A coherent coupled memory multiprocessor computer system as claimed in claim 4 wherein each of said plurality of coupled memory locations also includes an exclusive status bit, said shared and exclusive bits denoting whether a copy of the data stored in the related memory location is or is not also stored in a cache and, if stored in a cache, whether the cache stored data can be updated.

7. A coherent coupled memory multiprocessor computer system as claimed in claim 6 wherein said coupled memory control logic coherency maintaining means implements a write-back cache coherency management protocol.

8. A coherent coupled memory multiprocessor computer system as claimed in claim 6 wherein each of said plurality of processor modules also includes cache memory controller logic for coupling said cache memory to said processor, said cache memory controller logic including coherency maintaining means, said cache memory controller logic coherency maintaining means forming a portion of said means for maintaining coherency between data stored in the coupled memory of the associated processor module and data stored in the cache memory of the associated processor module and the cache memories of other processor modules.

9. A coherent coupled memory multiprocessor computer system as claimed in claim 8 wherein said coupled memory control logic coherency maintaining means and said cache memory controller logic coherency maintaining means implement a write-back cache coherency management protocol.

10. A coherent coupled memory multiprocessor computer system as claimed in claim 8 wherein each block of data stored in a cache includes an ownership bit denoting whether the associated data is readable or writable.

11. A coherent coupled memory multiprocessor computer system as claimed in claim 10 wherein said coupled memory control logic coherency maintaining means and said cache memory controller logic coherency maintaining means implement a write-back cache coherency management protocol.

12. A coherent coupled memory multiprocessor computer system as claimed in claim 10 wherein said cache memory controller logic controls whether a cache block of data can be updated based on the status of said ownership bit.

13. A coherent coupled memory multiprocessor computer system as claimed in claim 12 wherein said coupled memory control logic coherency maintaining means and said cache memory controller logic coherency maintaining means implement a write-back cache coherency management protocol.

14. A coherent coupled memory multiprocessor computer system as claimed in claim 12 wherein the status of said exclusive bit associated with said coupled memory locations is controlled by the status of the ownership bit associated with the same data stored in a cache.

15. A coherent coupled memory multiprocessor computer system as claimed in claim 14 wherein said coupled memory control logic coherency maintaining means and said cache memory controller logic coherency maintaining means implement a write-back cache coherency management protocol.

* * * * *